UNITED STATES PATENT OFFICE.

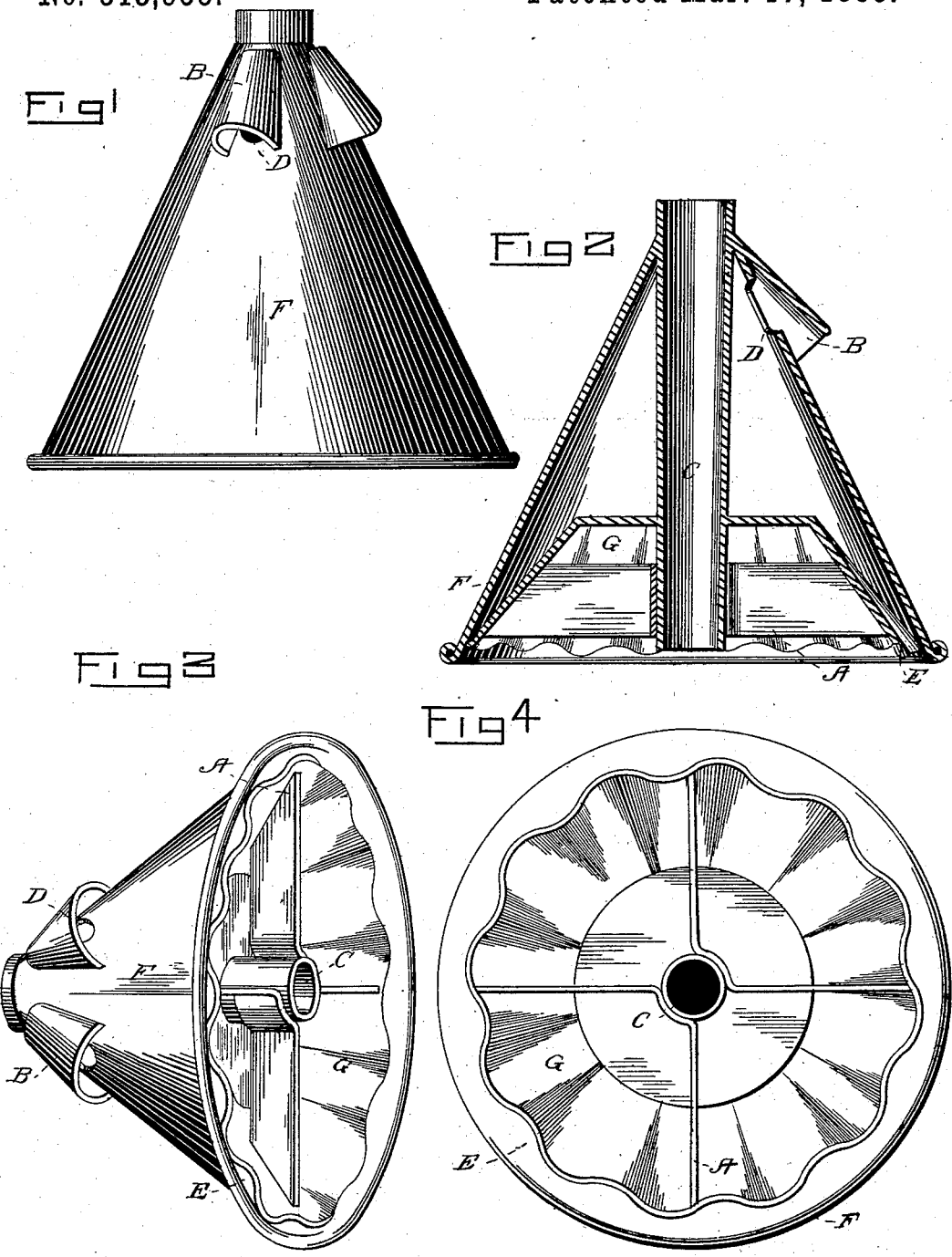

RUSSELL M. RINER, OF RICHMOND, INDIANA.

CLOTHES-POUNDER.

SPECIFICATION forming part of Letters Patent No. 313,955, dated March 17, 1885.

Application filed January 16, 1884. (Model.)

*To all whom it may concern:*

Be it known that I, RUSSELL M. RINER, of Richmond, Wayne county, Indiana, have invented an Improved Clothes-Pounder; and I do hereby declare that the following is a full and exact description thereof, reference being had to the accompanying drawings, making part of this specification—

Figure 1 being a side view of my improved clothes-pounder; Fig. 2, an axial vertical section of the same; Fig. 3, a view thereof in perspective, showing the lower inner side of the pounder; Fig. 4, a bottom view thereof.

Like letters designate corresponding parts in all of the figures.

The construction of my improved clothes-pounder is substantially as follows: A body, F, preferably of conical form, with the upper end truncated, receives a central socket, C, for the reception of a suitable handle, the socket preferably extending axially nearly or quite the whole height of the body, as shown. Thus far it is of usual construction. Within the lower flaring end of the body F, I secure an inverted pan or cup, G, of peculiar construction and action, as follows: The pan is broad, shallow, and flaring, which features of themselves are not new; but I make the flaring sides thereof scalloped or fluted, substantially as shown, the scallops or flutings being inclined directly downward and outward, and the outermost tangents of the several flutings nearly or quite reach to the inner surface of the conical body F, especially at the lower edge of the pan. With this fluted form of the pan the pan itself is not perforated, and fits tight around the socket C, so that there is offered no passage for water or air from below to the interior of the body F above the pan, except between the flutings of the pan and the inner surface of the body. The pan is braced and held firmly by means of radial arms A, extending from the socket C to the interior surface of the pan and securely attached to both. These arms are preferably made of thin metal set vertically edgewise, so as to offer as little surface and obstruction as possible to the entrance of the clothes into the pan, and they incidentally assist in compressing the clothes; but this feature is not new with me.

In order to provide for the free passage of water and air into and out of the body F above the pan, apertures D are made through the wall of the body F near its upper end; and in order that the ascending water or suds may not spout or splash upward through these apertures they are hooded. Such hooded apertures are not broadly new in my invention; but I hood each aperture with a narrow separate hood, B, formed to direct the water downward and obliquely outward in a distinct jet upon the clothes outside of the pounder in the tub or vessel containing the clothes. Thus additional efficient water circulation and agitation among the clothes are effected.

The improved effect of my invention, as above set forth and distinguished, will be readily understood. As the pounder descends upon the clothes in the water or suds a portion of the clothes is forced up into the pan G and compressed against its scalloped periphery. The inner flutings or scallops squeeze the clothes most, and the water or suds thereby pressed out of the clothes find immediate escape through adjacent scallop-grooves up into the body of the pounder above the pan. All of these outlet-grooves—so many in the aggregate—instantly fill the body with water or suds, and a considerable excess of the water or suds is forced out through the apertures D and directed by the hoods B upon the clothes outside of the pounder in forcible jets or streams. When the pounder is raised again, the tight-top pan G partially lifts the clothes held therein by atmospheric pressure, and at the same moment the water in the top of the body F descends in jets or streams through the same flutings and soaks through the uplifted clothes, the air admitted through the apertures D into the body F allowing the quick discharge of the water or suds therefrom to produce the action set forth. A very efficient pounder is thus produced, and one not likely to become obstructed and not holding any confined water, free from liability of becoming rusted.

I claim as my invention—

1. In a clothes-pounder, the combination, with the body F, of the inverted imperforate pan G, located in the lower end of the body, and having a scalloped periphery adapted to fit with its outer contours the inside of the body, and to thereby form a series of openings between the scalloped pan and body for the passage of water up and down therein, into and out of the said body, substantially as and for the purpose herein specified.

2. The combination of the body F, provided with perforations D D near its upper end, the inverted imperforate scalloped pan G, fitting within the lower part of the body, and the separate inclined hoods B B over the said perforations of the body, substantially as herein set forth, whereby, in the descent of the instrument upon the clothes, water is forced up through the pan-scallops into the body and a portion of the water is expelled in jets through the perforations, and in the ascent of the instrument the water in the body is caused to descend in separate streams through the scallops, for the purpose herein specified.

RUSSELL M. RINER.

Witnesses:
JAMES ELDER,
RALMARO PAIGE.